US012013976B2

(12) United States Patent
Wang et al.

(10) Patent No.: US 12,013,976 B2
(45) Date of Patent: Jun. 18, 2024

(54) CONTROL METHOD FOR AUDIO DEVICE, AUDIO DEVICE AND STORAGE MEDIUM

(71) Applicant: GOERTEK INC., Weifang (CN)

(72) Inventors: Xiaochen Wang, Weifang (CN); Li Ding, Weifang (CN); Shumin Zhou, Weifang (CN); Haipeng Zhou, Weifang (CN); Ke Dong, Weifang (CN)

(73) Assignee: GOERTEK INC., Weifang (CN)

( * ) Notice: Subject to any disclaimer, the term of this patent is extended or adjusted under 35 U.S.C. 154(b) by 134 days.

(21) Appl. No.: 17/473,092

(22) Filed: Sep. 13, 2021

(65) Prior Publication Data
US 2021/0405737 A1 Dec. 30, 2021

Related U.S. Application Data

(63) Continuation of application No. PCT/CN2019/130710, filed on Dec. 31, 2019.

(30) Foreign Application Priority Data

Nov. 15, 2019 (CN) .......................... 201911126147.4

(51) Int. Cl.
G06F 3/01 (2006.01)
G06F 3/14 (2006.01)
(Continued)

(52) U.S. Cl.
CPC ................ *G06F 3/011* (2013.01); *G06F 3/14* (2013.01); *H04R 1/028* (2013.01); *H04R 1/345* (2013.01);
(Continued)

(58) Field of Classification Search
CPC ........... G06F 3/011; G06F 3/14; H04R 1/028; H04R 1/345; H04R 3/00; H04R 2201/025; H04R 2499/15
See application file for complete search history.

(56) References Cited

U.S. PATENT DOCUMENTS 6,348,928 B1 * 2/2002 Jeong ................... H04N 21/426
345/650
2005/0275628 A1 * 12/2005 Balakrishnan ......... G02B 30/50
345/156
(Continued)

FOREIGN PATENT DOCUMENTS

CN 104898818 A 9/2015
CN 106774797 A * 5/2017 .......... B25J 11/0005
(Continued)

OTHER PUBLICATIONS

Incredibles (Youtube video, "5 Coolest ROBOTS You Can Actually Own!", https://www.youtube.com/watch?v=W07gNVGo7e8, Nov. 22, 2016) (Year: 2016).*

(Continued)

Primary Examiner — Yu Chen
(74) Attorney, Agent, or Firm — HAUPTMAN HAM, LLP

(57) ABSTRACT

Disclosed is a control method for an audio device, the audio device includes a playing component and a display screen rotatably connected to the playing component, and the control method for the audio device includes the following steps: detecting a position of a user; determining a rotation mode of the display screen according to the position; acquiring a display expression corresponding to the rotation mode; and displaying the display expression on the display screen, and controlling the display screen to operate according to the rotation mode. This disclosure further provides an audio device and a computer-readable storage medium. This application improves the user's interaction experience with the audio device.

9 Claims, 6 Drawing Sheets

(51) Int. Cl.
*H04R 1/02* (2006.01)
*H04R 1/34* (2006.01)
*H04R 3/00* (2006.01)

(52) U.S. Cl.
CPC ......... *H04R 3/00* (2013.01); *H04R 2201/025* (2013.01); *H04R 2499/15* (2013.01)

(56) References Cited

U.S. PATENT DOCUMENTS

| | | | | |
|---|---|---|---|---|
| 2008/0122867 | A1* | 5/2008 | Kung | G06T 13/80 |
| | | | | 345/629 |
| 2013/0191753 | A1* | 7/2013 | Sugiyama | G06F 3/165 |
| | | | | 715/727 |
| 2014/0062860 | A1* | 3/2014 | Lee | G06F 3/0304 |
| | | | | 345/156 |
| 2016/0077592 | A1* | 3/2016 | Bhesania | G06F 3/013 |
| | | | | 345/650 |
| 2016/0151917 | A1 | 6/2016 | Faridi et al. | |
| 2017/0278480 | A1* | 9/2017 | Sung | G06V 40/166 |
| 2018/0154514 | A1* | 6/2018 | Angle | G05D 1/021 |
| 2018/0293962 | A1* | 10/2018 | Lee | G06F 3/013 |
| 2020/0236489 | A1* | 7/2020 | Merimaa | H04R 5/033 |
| 2020/0264006 | A1* | 8/2020 | Sommer | H04W 4/029 |
| 2020/0351581 | A1* | 11/2020 | Wang | H04R 1/2803 |
| 2020/0382747 | A1* | 12/2020 | Prins | H04S 7/303 |
| 2021/0397214 | A1* | 12/2021 | Yamamoto | F16M 11/10 |

FOREIGN PATENT DOCUMENTS

| | | |
|---|---|---|
| CN | 107300973 A | 10/2017 |
| CN | 108214490 A | 6/2018 |
| CN | 108297098 A | 7/2018 |
| CN | 207895660 U | 9/2018 |
| CN | 207901174 U | 9/2018 |
| CN | 108664123 A | 10/2018 |
| CN | 109327763 A | 2/2019 |
| CN | 109460072 A | 3/2019 |
| CN | 109491751 A | 3/2019 |
| CN | 109871125 A | 6/2019 |
| JP | 2001312332 A | 11/2001 |

OTHER PUBLICATIONS

International Search Report and Written Opinion issued in corresponding International Application No. PCT/CN2019/130710; dated Aug. 20, 2020; China National Intellectual Administration, Beijing, China, 13 pgs.

Office Action in corresponding Chinese Application No. 201911126147.4; dated Sep. 21, 2020; 13 pgs.

* cited by examiner

CONTROL METHOD FOR AUDIO DEVICE, AUDIO DEVICE AND STORAGE MEDIUM

CROSS REFERENCE TO RELATED APPLICATIONS

This disclosure is a Continuation Application of International Application No. PCT/CN2019/130710, filed on Dec. 31, 2019, which claims the priority to Chinese Patent Application No. 201911126147.4, entitled "Control method for audio device, audio device and storage medium", submitted to the China National Intellectual Property Administration on Nov. 15, 2019, which is hereby incorporated by reference in its entirety.

TECHNICAL FIELD

This disclosure relates to the technical field of audio devices, in particular to a control method for an audio device, audio device and computer-readable storage medium.

BACKGROUND

At present, smart loudspeakers play an increasingly important role in people's lives, acting as a small assistant for users in life. While providing entertainment for users, they can also help users deal with some trivial matters in life. The smart loudspeaker can even be used as the entrance or central control of the smart home in the whole house, so that users can easily control the smart home through the smart loudspeaker.

With the improvement of people's living standards, users increasingly hope that smart loudspeakers will be more intelligent and even personified. However, at present, users' interaction with smart loudspeakers is generally a response interaction at the primary level.

Such a question-and-answer mechanical interaction makes a poor interaction experience between users and smart loudspeakers.

The above content is only used to assist the understanding of the technical solution of this disclosure, and does not mean that the above content is recognized as the prior art.

SUMMARY

The main object of this disclosure is to provide a control method for an audio device, an audio device, and a computer-readable storage medium, so as to improve the interaction experience between a user and the audio device.

In order to achieve the above object, this disclosure provides a control method for an audio device, the audio device includes a playing component and a display screen rotatably connected to the playing component, and the control method for the audio device includes the following steps:
 detecting a position of a user;
 determining a rotation mode of the display screen according to the position;
 acquiring a display expression corresponding to the rotation mode; and
 displaying the display expression on the display screen, and controlling the display screen to operate according to the rotation mode.

Optionally, the step of determining a rotation mode of the display screen according to the position includes:
 determining a target area according to the position; and
 determining the rotation mode of the display screen according to the target area.

Optionally, in a determination that the target area is a first area, determining that the rotation mode is a first rotation mode; in a determination that the target area is a second area, determining that the rotation mode is a second rotation mode; and in a determination that the target area is a third area, determining that the rotation mode is a third rotation mode; and
 the first rotation mode is to control the display screen to rotate back and forth at a first preset angle; the second rotation mode is to control the display screen to rotate counterclockwise; and the third rotation mode is to control the display screen to rotate clockwise.

Optionally, sound apparatuses are arranged on the playing component, and after the step of determining a target area according to the position, the control method for the audio device further includes:
 acquiring a sound apparatus corresponding to the target area as a target sound apparatus; and
 controlling the audio device to output sound effects through the target sound apparatus.

Optionally, before the step of controlling the audio device to output sound effects through the target sound apparatus, the control method for the audio device further includes:
 detecting whether the user is in motion;
 in a determination that the user is not in motion, performing the step of acquiring a sound apparatus corresponding to the target area as a target sound apparatus; and
 in a determination that the user is in motion, acquiring all the sound apparatuses of the audio device as the target sound apparatus.

Optionally, the control method for the audio device further includes:
 in response to detecting a preset instruction issued by the user, determining a current operating mode of the display screen; and
 in a determination that the operating mode is a working mode, performing the step of detecting a position of a user.

Optionally, after the step of in response to detecting a preset instruction issued by the user, determining a current operating mode of the display screen, the control method for the audio device further includes:
 in a determination that the operating mode is a standby mode, displaying a display expression corresponding to the first rotation mode on the display screen, and controlling the display screen to operate according to the first rotation mode; and
 controlling the display screen to switch from the standby mode to the working mode.

Optionally, after the step of in response to detecting a preset instruction issued by the user, determining a current operating mode of the display screen, the control method for the audio device further includes:
 in a determination that the operating mode is a sleep mode, displaying a display expression corresponding to a fourth rotation mode on the display screen, and controlling the display screen to operate according to the fourth rotation mode, the fourth rotation mode is to control the display screen to rotate around a rotation shaft in a preset rotation direction until an angle between the display screen and a horizontal plane is increased to a second preset angle, and the playing component is rotatably connected to the display screen through the rotation shaft; and controlling the display screen to switch from the sleep mode to the working mode.

In order to achieve the above object, this disclosure further provides an audio device, the audio device includes a playing component and a display screen rotatably connected to the playing component, and the audio device includes:

a memory, a processor, and a control program for the audio device stored on the memory and operable on the processor, and when the control program for the audio device is executed by the processor, the steps of the control method for the audio device as described above are implemented.

In order to achieve the above object, this disclosure further provides a computer-readable storage medium, a control program for an audio device is stored thereon, and when the control program for the audio device is executed by a processor, the steps of the control method for the audio device as described above are implemented.

According to the control method for the audio device, the audio device, and the computer-readable storage medium provided by this disclosure, a position of a user is detected; a rotation mode of the display screen is determined according to the position; a display expression corresponding to the rotation mode is acquired; and the display expression is displayed on the display screen, and the display screen is controlled to operate according to the rotation mode. In this way, according to the different positions of the user relative to the audio device, the display screen of the audio device is controlled to rotate differently, and at the same time, the display screen is controlled to perform differential display of display expressions, thereby improving the interaction experience between the user and the audio device.

BRIEF DESCRIPTION OF THE DRAWINGS

In order to more clearly explain the embodiments of this disclosure or the technical solutions in the related art, the drawings used in the description of the embodiments or the related art will be briefly introduced below. Obviously, the drawings in the following description are merely part of the drawings of this disclosure. For those of ordinary skill in the art, other drawings can be obtained based on these drawings without paying creative work.

The realization of the objects, functional characteristics and advantages of this disclosure will be further described in conjunction with the embodiments and with reference to the drawings.

DETAILED DESCRIPTION OF THE EMBODIMENTS

It should be understood that the specific embodiments described herein are only used to explain this disclosure, and are not used to limit this disclosure.

This disclosure provides a control method for an audio device, which improves the interaction experience between a user and the audio device.

Figure 1:
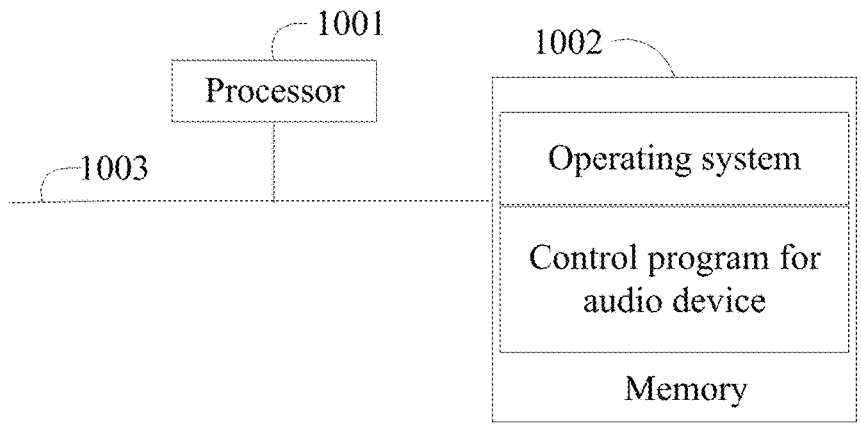
FIG. 1 is a schematic diagram of a hardware operating environment of a terminal according to an embodiment of this disclosure.

As shown in FIG. 1, FIG. 1 is a schematic diagram of a hardware operating environment of a terminal according to an embodiment of this disclosure.

The terminal in this embodiment of this disclosure may be an audio device, or may be a server or a control terminal that controls the audio device.

Referring to FIG. 1, the terminal may include: a processor 1001, such as a Central Processing Unit (CPU), a memory 1002, and a communication bus 1003. The communication bus 1003 is configured to realize the connection communication between the components in the terminal. The memory 1002 can be either a high-speed random-access memory (RAM) or a stable non-volatile memory, such as a disk memory. Optionally, the memory 1002 may be a storage device independent of the foregoing processor 1001.

Those skilled in the art may understand that the structure of the terminal shown in FIG. 1 does not constitute a limitation on the terminal, and more or less components than those illustrated may be included in the terminal, or certain components may be combined, or different components may be arranged.

As shown in FIG. 1, the memory 1002 as a computer-readable storage medium may include a control program for an audio device.

In the terminal shown in FIG. 1, the processor 1001 can be configured to call the control program for the audio device stored on the memory 1002 and perform the following operations:

detecting a position of a user;

determining a rotation mode of the display screen according to the position;

acquiring a display expression corresponding to the rotation mode; and displaying the display expression on the display screen, and controlling the display screen to operate according to the rotation mode.

Further, the processor 1001 can call the control program for the audio device stored on the memory 1002 to further perform the following operations:

determining a target area according to the position; and determining the rotation mode of the display screen according to the target area.

Further, the processor 1001 can call the control program for the audio device stored on the memory 1002 to further perform the following operations:

in a determination that the target area is a first area, determining that the rotation mode is a first rotation mode; in a determination that the target area is a second area, determining that the rotation mode is a second rotation mode; and in a determination that the target area is a third area, determining that the rotation mode is a third rotation mode; and the first rotation mode is to control the display screen to rotate back and forth at a first preset angle; the second rotation mode is to control the display screen to rotate counterclockwise; and the third rotation mode is to control the display screen to rotate clockwise.

Further, sound apparatuses are arranged on the playing component, and after the step of determining a target area according to the position, and the processor 1001 can call the control program for the audio device stored on the memory 1002 to further perform the following operations:

acquiring a sound apparatus corresponding to the target area as a target sound apparatus; and controlling the audio device to output sound effects through the target sound apparatus.

Further, the processor 1001 can call the control program for the audio device stored on the memory 1002 to further perform the following operations:

detecting whether the user is in motion;

in a determination that the user is not in motion, performing the step of acquiring a sound apparatus corresponding to the target area as a target sound apparatus; and in a determination that the user is in motion, acquiring all the sound apparatuses of the audio device as the target sound apparatus.

Further, the processor 1001 can call the control program for the audio device stored on the memory 1002 to further perform the following operations:

in response to detecting a preset instruction issued by the user, determining a current operating mode of the display screen; and in a determination that the operating mode is a working mode, performing the step of detecting a position of a user.

Further, the processor 1001 can call the control program for the audio device stored on the memory 1002 to further perform the following operations:

in a determination that the operating mode is a standby mode, displaying a display expression corresponding to the first rotation mode on the display screen, and controlling the display screen to operate according to the first rotation mode; and controlling the display screen to switch from the standby mode to the working mode.

Further, the processor 1001 can call the control program for the audio device stored on the memory 1002 to further perform the following operations:

in a determination that the operating mode is a sleep mode, displaying a display expression corresponding to a fourth rotation mode on the display screen, and controlling the display screen to operate according to the fourth rotation mode, wherein the fourth rotation mode is to control the display screen to rotate around a rotating shaft in a preset rotation direction until an angle between the display screen and a horizontal plane is increased to a second preset angle, and the playing component is rotatably connected to the display screen through the rotating shaft; and controlling the display screen to switch from the sleep mode to the working mode.

Figure 2:
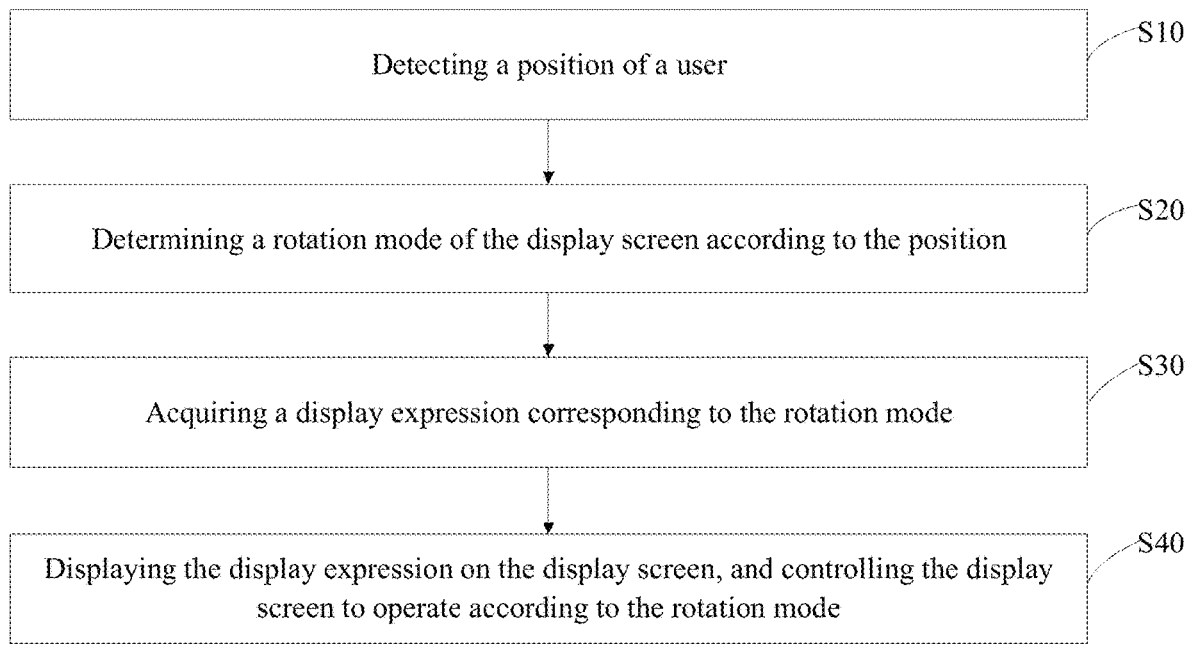
FIG. 2 is a flow chart of a first embodiment of a control method for an audio device according to this disclosure.

Referring to FIG. 2, in an embodiment, the control method for the audio device includes:

S10. Detecting a position of a user.

In this embodiment, the terminal may be an audio device, or may be a control terminal or a server of the audio device. The following is described by taking the embodiment terminal as an audio device as an example. It should be noted that the audio device can be a smart loudspeaker.

Figure 7:
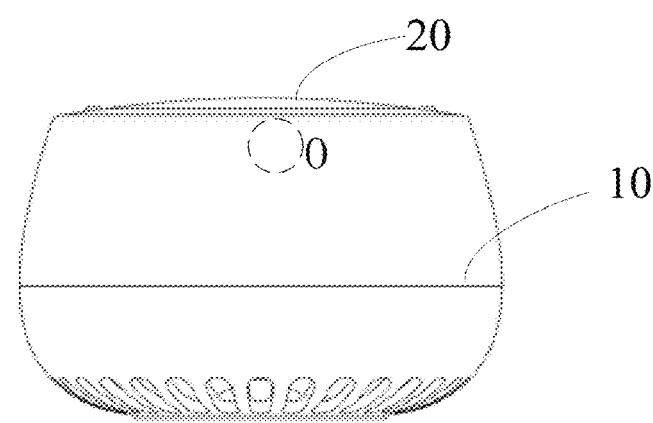
FIG. 7 is a schematic structural diagram of an audio device in a display sleep mode of a control method for an audio device according to an embodiment of this disclosure.

Optionally, referring to FIG. 7, the audio device includes a playing component 10 and a display screen 20. The display screen 20 is connected to the playing component 10 through a rotating shaft O, and the display screen 20 can rotate around the rotating shaft O. The playing component 10 is provided with an accommodating area 11, and the accommodating area 11 is a spherical area. One side of the display screen 20 is a flat display area, and the other side of the display screen 20 is a spherical structure matching the spherical area of the accommodating area 11, and the accommodating area 11 can be configured to accommodate the display screen 20. Optionally, when the audio device is smoothly placed on a supporting surface relatively flat with the horizontal plane through the playing component 10, a plane where the accommodating area 11 is located is relatively parallel with the horizontal plane, and when the display screen 20 is placed in the accommodating area 11, the display screen 20 is relatively parallel with the horizontal plane, and at this time, the operating mode of the display screen 20 is the sleep mode.

Figure 8:
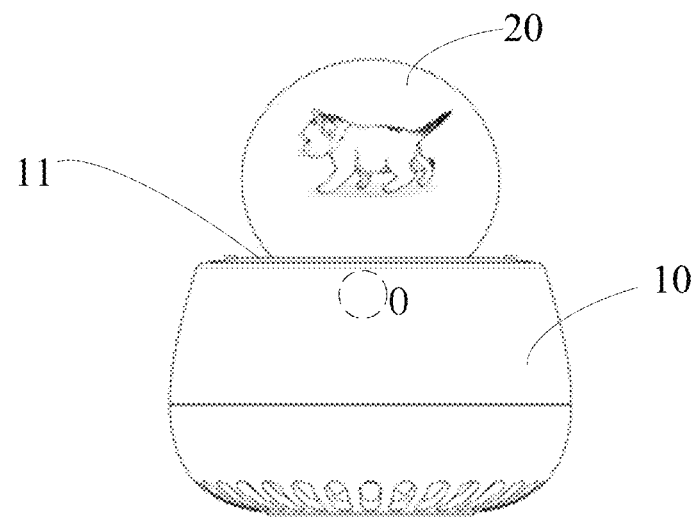
FIG. 8 is a front view of a display screen in a working mode or sleep mode of the control method for the audio device according to an embodiment of this disclosure.
Figure 9:
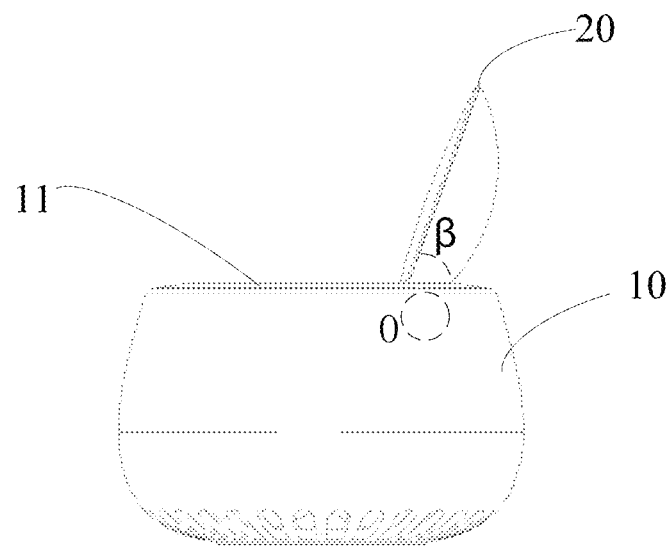
FIG. 9 is a side view of the display screen in the working mode or sleep mode of the control method for the audio device according to an embodiment of this disclosure.
Figure 10:
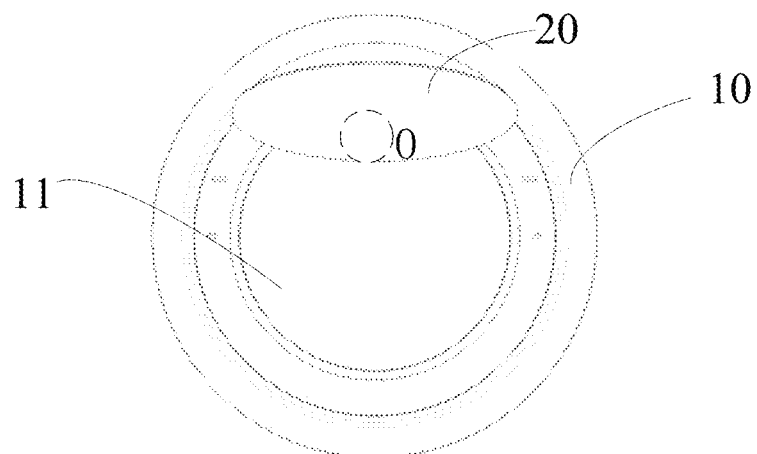
FIG. 10 is a top view of the display screen in the working mode or sleep mode of the control method for the audio device according to an embodiment of this disclosure.

Further, referring to FIGS. 8 to 10, the display screen 20 can rotate clockwise or counterclockwise with respect to the horizontal plane around the rotating shaft O, and at the same time, the display screen 20 can rotate eccentrically with respect to the spherical region of the accommodating region 11 around the rotating shaft O. Further, when the display screen 20 moves away from the accommodating area 11 by rotating around the rotating shaft O, a certain angle β is formed between the display screen 20 and the horizontal plane. At this time, the operating mode of the display screen 20 is a working mode or a standby mode. When the display screen 20 is in a horizontal position, β is 0 degree, when the display screen 20 is rotated counterclockwise around the rotating shaft O from the horizontal position, β gradually increases from 0 degree until reaching a maximum angle, when the display screen 20 continues to be rotated counterclockwise around the rotating shaft O, the angle β gradually decreases from the maximum angle. Similarly, when the display screen 20 is in a horizontal position, β is 0 degree, when the display screen 20 is rotated clockwise around the rotating shaft O from the horizontal position, β gradually increases from 0 degree until reaching a maximum angle, when the display screen 20 continues to be rotated clockwise around the rotating shaft O, the angle β gradually decreases from the maximum angle.

Optionally, the rotating shaft O of the audio device is connected with a motor, and the terminal can control the rotation of the display screen by driving the motor to rotate.

Optionally, the display screen is a circular display screen.

It should be noted that when the audio device is placed flat on a supporting surface flat with the horizontal plane, when the display screen is operated in the working mode or the standby mode, the value range of the included angle θ formed between the plane where the display screen is located and the horizontal plane can be (0°, 90°]; and when the display screen is operated in the sleep mode, the included angle β' formed between the plane where the display screen is located and the horizontal plane can be 0°.

Optionally, the terminal may detect a current location of the user when it detects that the user is in a space where the audio device is located, or may detect the current location of the user when receiving a control instruction for the audio device issued by the user.

S20. Determining a rotation mode of the display screen according to the position.

Optionally, the terminal divides a working space of the audio device into a plurality of preset regions in advance, and each preset region is associated with a corresponding rotation mode of the display screen.

Optionally, the rotation mode of the display screen includes at least one of a first rotation mode, a second rotation mode, a third rotation mode, and a fourth rotation mode.

Optionally, the first rotation mode is to control the display screen in the working mode or the standby mode to rotate back and forth at a first preset angle. Specifically, the terminal controls a motor to drive the display screen to rotate back and forth around the rotating shaft O at the first preset angle, that is, taking a current position of the display screen as an initial position, the terminal controls the motor to drive the display screen to rotate the first preset angle clockwise around the rotating shaft O from the initial position, and then controls the motor to drive the display screen to rotate counterclockwise around the rotating shaft O back to the initial position, then continues to rotate the first preset angle counterclockwise, and then controls the motor to drive the display screen to rotate the first preset angle clockwise, so as to make a circular round-trip movement.

It should be understood that the terminal can also control the motor to drive the display screen to rotate the first preset angle counterclockwise around the rotating shaft O starting from the initial position, then control the motor to drive the display screen to rotate clockwise around the rotating shaft O back to the initial position, then continue to rotate the first preset angle clockwise, and then control the motor to drive the display screen to rotate the first preset angle counterclockwise, so as to make a circular round-trip movement. It should be noted that the value range of the first preset angle may be 10°-30°, optionally 15°.

Optionally, the second rotation mode is to control the display screen in the working mode or the standby mode to rotate a preset angle counterclockwise around the rotating shaft O from the initial position, and the value range of the preset angle can be 10°-30°, optionally 15°.

Optionally, the third rotation mode is to control the display screen in the working mode or the standby mode to rotate a preset angle clockwise around the rotating shaft O from the initial position, and the value range of the preset angle can be 10°-30°, optionally 15°.

Optionally, the fourth rotation mode is to control the display screen in the sleep mode to rotate eccentrically in a preset rotation direction around the rotating shaft O from the horizontal position starting from a current position of the display screen, namely, the initial position, so as to increase the angle θ between the plane where the display screen is located and the horizontal plane, so that the angle θ gradually increases from 0 degree until the second preset angle is reached. After the display screen rotates, the operating mode of the display screen is switched from the sleep mode to the working mode or the standby mode.

Optionally, the value range of the second preset angle is (0°, 90°], optionally 60°; optionally, the second preset angle is equal to a maximum angle that can be reached by the included angle formed between the plane where the display screen is located and the horizontal plane.

It should be noted that the preset rotation direction is clockwise or counterclockwise.

Optionally, after acquiring the current position of the user, the terminal acquires a preset area where the user is located as a target area, and acquires a rotation mode associated with the target area.

S30. Acquiring a display expression corresponding to the rotation mode.

Optionally, different rotation modes are pre-associated with corresponding display expressions. The display expressions are configured to be displayed on the display screen to enhance the personification effect when the display screen interacts with the user and increase the fun in the process of human-computer interaction.

It should be noted that the display expressions associated with different rotation modes may be the same or different, and at least one display expression may be associated with each rotation mode.

Optionally, the first rotation mode is associated with a first display expression and/or a second display expression, the second rotation mode is associated with a third display expression, the third rotation mode is associated with a third display expression, and the fourth rotation mode is associated with a fourth display expression.

Figure 11:
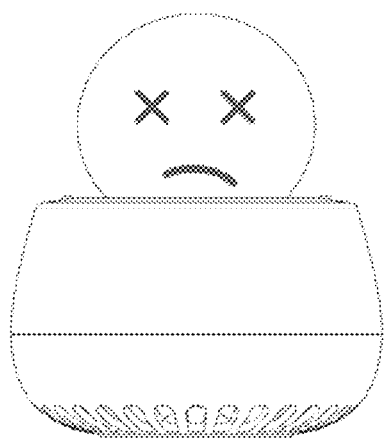
FIG. 11 is a schematic diagram of a first display expression of the control method for the audio device according to an embodiment of this disclosure.
Figure 12:
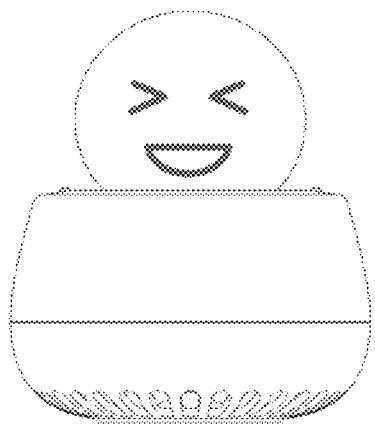
FIG. 12 is a schematic diagram of a second display expression of the control method for the audio device according to an embodiment of this disclosure.
Figure 13:
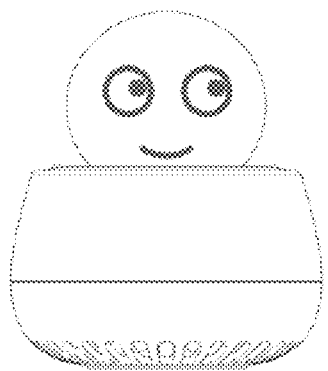
FIG. 13 is a schematic diagram of a third display expression of the control method for the audio device according to an embodiment of this disclosure.
Figure 14:
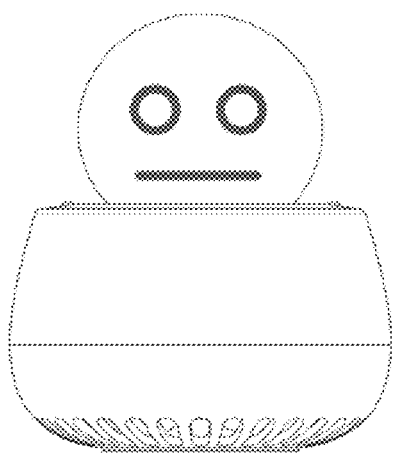
FIG. 14 is a schematic diagram of a fourth display expression of the control method for the audio device according to an embodiment of this disclosure.

Optionally, referring to FIG. 11, the first display expression can be a confused mode expression; referring to FIG. 12, the second display expression can be a surprise mode expression; referring to FIG. 13, the third display expression can be a thinking mode expression; and referring to FIG. 14, the fourth display expression can be a daze mode expression.

Optionally, after determining the rotation mode of the display screen, the terminal acquires the display expression corresponding to the determined rotation mode.

S40. Displaying the display expression on the display screen, and controlling the display screen to operate according to the rotation mode.

Optionally, after the terminal acquires the rotation mode and the display expression of the display screen, the acquired display expression is displayed on the display screen, and at the same time, the display screen is controlled to rotate in the acquired rotation mode.

For example, when the display expression acquired by the terminal is the first display expression, and the rotation mode is the first rotation mode, the motor is started to drive the display screen to rotate back and forth around the rotating shaft O at a first preset angle of 15°, so that the display screen shows an effect of slight rotation left and right. For example, the rotation path can be "15° counterclockwise→0°→15° clockwise→0°", and the confused mode expression is displayed on the display screen at the same time. In this way, the audio device as a whole performs like a little person shaking his head left and right with a confused expression at the same time.

In this way, the display screen of the audio device is given an action and expression color, and the anthropomorphic effect of the display screen can be realized, so that when the users are interacting with the audio device, they are no longer faced with a cold device, but an audio device with strong personality, thereby increasing the fun in the process of human-computer interaction, and improving the interactive experience between the user and the audio device.

In an embodiment, a position of a user is detected; a rotation mode of the display screen is determined according to the position; a display expression corresponding to the rotation mode is acquired; and the display expression is displayed on the display screen, and the display screen is controlled to operate according to the rotation mode. In this way, according to the different positions of the user relative to the audio device, the display screen of the audio device is controlled to rotate differently, and at the same time, the display screen is controlled to perform differential display of display expressions, thereby improving the interaction experience between the user and the audio device.

Figure 3:
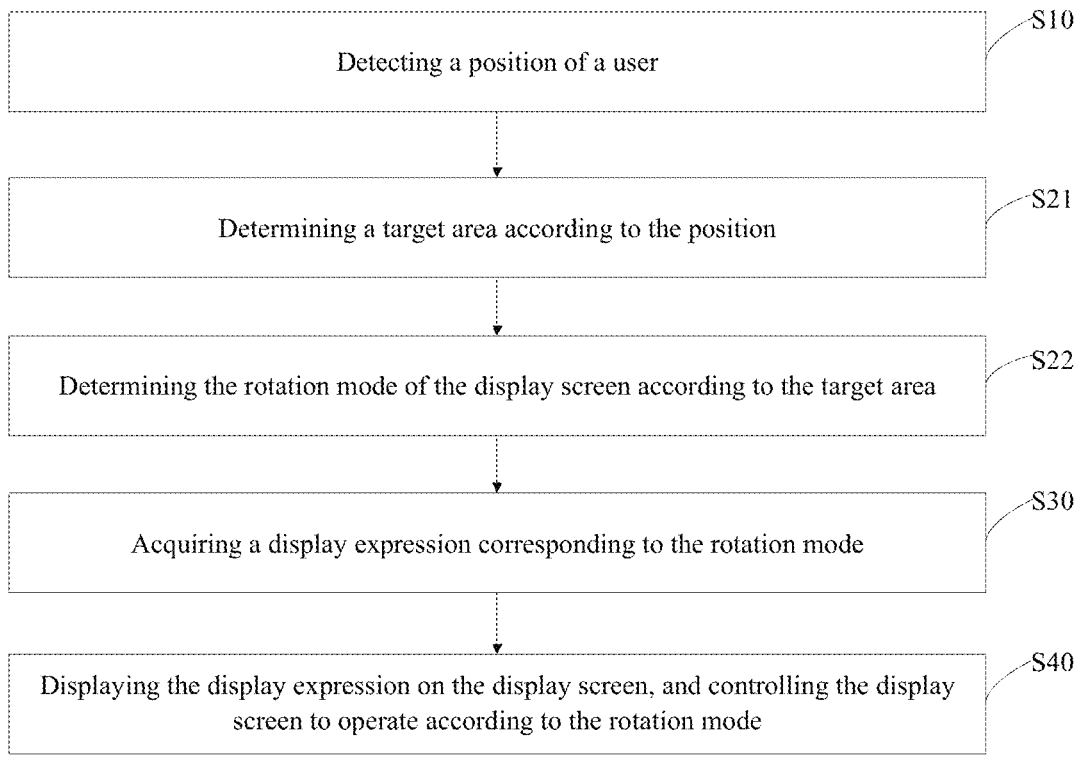
FIG. 3 is a flow chart of a second embodiment of the control method for the audio device according to this disclosure.

In a second embodiment, as shown in FIG. 3, on the basis of the embodiment shown in FIG. 2, the step of determining a rotation mode of the display screen according to the position includes:

S21. Determining a target area according to the position.

S22. Determining the rotation mode of the display screen according to the target area.

In this embodiment, the terminal divides a space where the audio device is located into a plurality of preset regions in advance, and each preset region is associated with a corresponding rotation mode of the display screen. After acquiring the current position of the user, the terminal acquires a preset area corresponding to a position where the user is located as a target area, and acquires a rotation mode associated with the target area.

Figure 15:
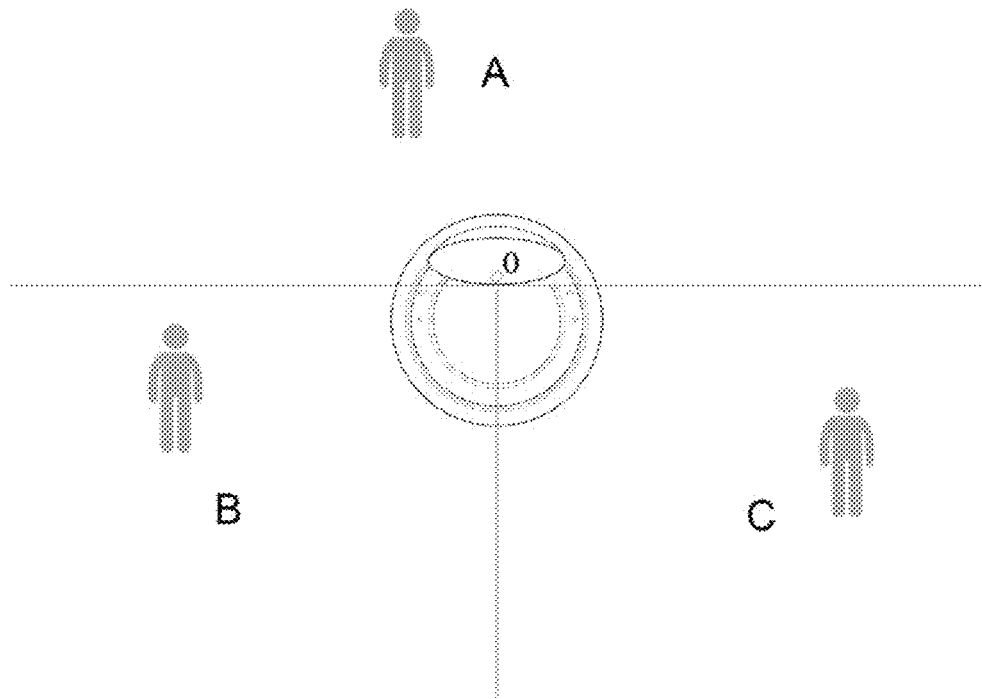
FIG. 15 is a schematic diagram of division of a preset area according to an embodiment of the control method for the audio device of this disclosure.

Optionally, referring to FIG. 15, the terminal pre-divides the space where the audio device is located into a first region A, a second region C, and a third region B, where the rotating shaft O is located in the first region A.

Optionally, a rotation mode associated with the first region is the first rotation mode; a rotation mode associated with the second region is the second rotation mode; and a rotation mode associated with the third region is the third rotation mode.

Optionally, when determining that a target area corresponding to the position of the user is the first area A, the terminal controls the display screen to rotate in the first rotation mode, and displays the display expression corresponding to the first rotation mode.

Optionally, when determining that a target area corresponding to the position of the user is the second area C, the terminal controls the display screen to rotate in the second rotation mode, and displays the display expression corresponding to the second rotation mode. In this way, after the display screen is rotated by the first preset angle counter-clockwise, the display orientation of the display screen can be made to face the position where the user is located, so that the user can see the display expression displayed by the display screen.

Optionally, when determining that a target area corresponding to the position of the user is the third area B, the terminal controls the display screen to rotate in the third rotation mode, and displays the display expression corresponding to the third rotation mode. In this way, after the display screen is rotated by the first preset angle clockwise, the display orientation of the display screen can be made to face the region where the user is located, so that the user can see the display expression displayed by the display screen.

Optionally, a plurality of sound apparatuses (e. g., loudspeakers) are arranged on the playing component of the audio device, and different preset areas are pre-associated with corresponding sound apparatuses, and the sound apparatus associated with the preset area is located in the preset area.

Optionally, after determining the target area corresponding to the position of the user, the terminal acquires a sound apparatus associated with the target area as the target sound apparatus, and performs sound effect output through the target sound apparatus when the audio device needs to perform sound effect output. Optionally, a situation where the audio device needs to perform sound effect output is that when the audio device receives the user's control instruction, it needs to perform voice feedback, and then performs sound effect output through the target sound apparatus. In this way, by cooperation of sound apparatuses in different positions, users can feel the difference in delicate sound directions, and finally an anthropomorphic interactive experience of "listening-responding" can be created.

Optionally, after the display screen is operated in the acquired rotation mode, when the sound effect output of the audio device is finished, the display screen can be controlled to rotate back to the initial position. Before the audio device needs to perform sound effect output next time, the display screen is controlled to perform steps S10 to step S40.

Optionally, before the terminal acquires the target sound apparatus, the position of the user detected within a first preset duration may be acquired, and then whether the user is in motion may be determined according to the acquired position of the user. It should be noted that the value range of the first preset duration can be 5 seconds to 10 seconds.

Optionally, the terminal may calculate a displacement of the user according to at least two positions of the user acquired within the first preset duration. When the displacement is greater than a preset distance, it is determined that the user is in motion; and when the displacement is less than or equal to the preset distance, it is determined that the user is not in motion.

Optionally, when the terminal determines that the user is not in motion, the terminal acquires the sound apparatus corresponding to the target area as the target sound apparatus, and controls the audio device to perform audio effect output through the target sound apparatus.

Optionally, when the terminal determines that the user is in motion, the terminal acquires all sound apparatuses of the audio device as the target sound apparatus, and controls the audio device to perform audio effect output through the target sound apparatus. In this way, since the user is in motion, activating all sound apparatuses can prevent the user from failing to hear the audio effect output of the audio device clearly.

In this way, the intelligent rotating screen loudspeaker determines different positions of the user relative to the loudspeaker, the circular screen correspondingly gives different rotation modes, and the screen displays different expressions. At the same time, with the activation of loudspeakers at different positions, the user can feel the difference in delicate sound directions, and finally an anthropomorphic interactive experience of "listening-responding" can be created.

Figure 4:
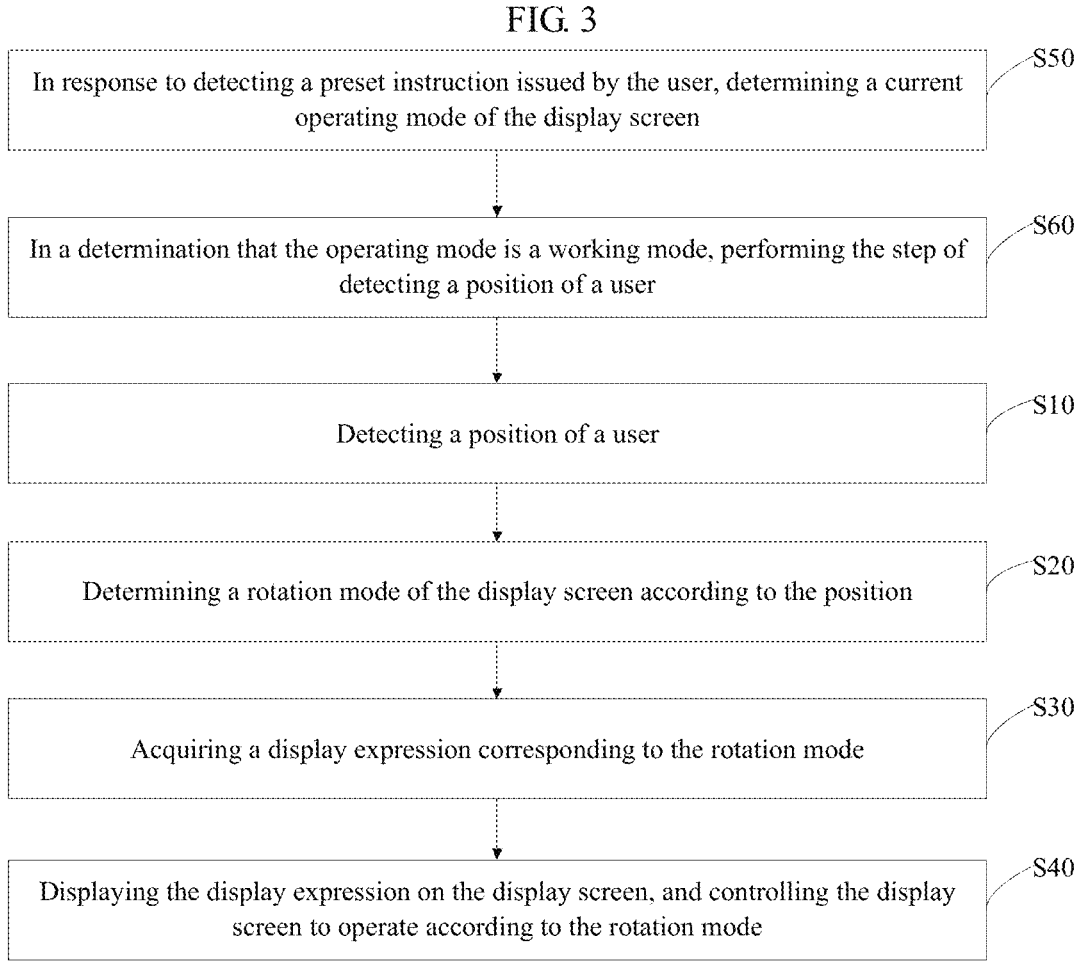
FIG. 4 is a flow chart of a third embodiment of the control method for the audio device according to this disclosure.

In a third embodiment, as shown in FIG. 4, on the basis of the embodiments of FIGS. 2 to 3 above, the control method for the audio device further includes:

S50. In response to detecting a preset instruction issued by the user, determining a current operating mode of the display screen.

S60. In a determination that the operating mode is a working mode, performing the step of detecting a position of a user.

In this embodiment, the operating mode of the display screen of the audio device includes a working mode, a standby mode and a sleep mode.

Optionally, when detecting a preset instruction for the audio device issued by the user, the terminal detects a current operating mode of the display screen. It should be noted that the preset instruction may be a control instruction preset by the audio device, such as controlling the audio device to play music, issuing a query instruction to the audio device, and so on.

Optionally, the preset instruction may be a voice instruction.

Optionally, when detecting that the current operating mode of the display screen is the operating mode, the terminal executes a step of detecting the position of the user (namely, steps S10 to S40 are executed).

Optionally, when the display screen is currently in the working mode, the display expression corresponding to the first rotation mode is the first display expression.

Optionally, when detecting that the display screen in the working mode does not receive a preset instruction sent by the user within a second preset duration, the terminal can control the operating mode of the display screen to switch to the standby mode. Optionally, when the display screen is in the standby mode, the terminal can control the display screen to turn off or reduce the brightness of the display screen. It should be noted that a value range of the second preset duration can be 30 seconds to 2 minutes.

Optionally, when receiving the shutdown instruction of the audio device, the terminal controls the motor to drive the display screen to rotate a certain angle around the rotating shaft O in the preset rotation direction starting from the current position of the display screen, namely, the initial position, until the angle β' formed between the plane where the display screen is located and the horizontal plane is 0°. After rotation of the display screen is finished, the operating mode of the display screen is switched from the working mode to the sleep mode. It should be noted that the preset rotation direction is clockwise or counterclockwise.

Optionally, the terminal controls the display screen in the sleep mode to turn off.

In this way, when the display screen is controlled in different working modes, the rotation mode and the display expression corresponding to the working mode are acquired, so that the user can feel different reactions when the display screen is awakened in different working modes, and the human-computer interaction experience is improved.

Figure 5:
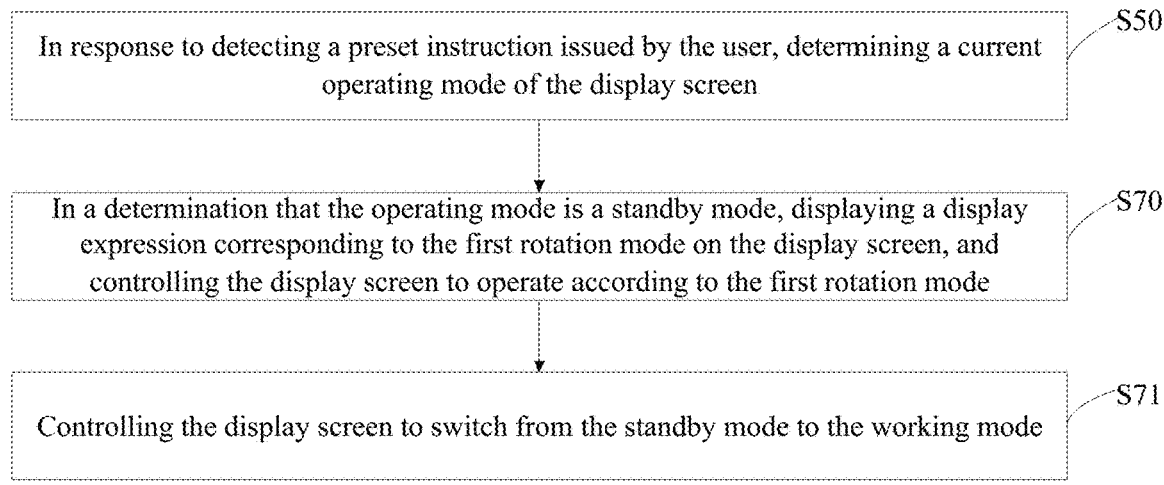
FIG. 5 is a flow chart of a fourth embodiment of the control method for the audio device according to this disclosure.

In a fourth embodiment, as shown in FIG. 5, on the basis of the embodiments of FIG. 2 to FIG. 4, after the step of in response to detecting a preset instruction issued by the user, determining a current operating mode of the display screen, the control method for the audio device further includes:

S70. In a determination that the operating mode is a standby mode, displaying a display expression corresponding to the first rotation mode on the display screen, and controlling the display screen to operate according to the first rotation mode.

S71. Controlling the display screen to switch from the standby mode to the working mode.

In this embodiment, the operating mode of the display screen of the audio device includes a working mode, a standby mode and a sleep mode.

Optionally, when detecting a preset instruction for the audio device issued by the user, the terminal detects a current operating mode of the display screen. It should be noted that the preset instruction may be a control instruction preset by the audio device, such as controlling the audio device to play music, issuing a query instruction to the audio device, and so on.

Optionally, when the current operating mode of the display screen is the standby mode, the user may issue a voice instruction with a wake-up word as a preset instruction to wake up the display screen. It should be noted that the wake-up word in the standby mode of the display screen can be preset by the engineer or user according to the actual situation.

Optionally, when the user's wake-up word is detected, the display screen is controlled to be on, and the first rotation mode and the display expression corresponding to the first rotation mode are acquired. Then the display screen is controlled to display the acquired display expression and operate in the first rotation mode.

Optionally, when the display screen is currently in the standby mode, the display expression corresponding to the first rotation mode is the second display expression (namely, the surprise mode expression).

For example, when the display screen is in the standby mode, after the smart loudspeaker detects the wake-up word, it first detects the screen position state according to a rotation angle of the motor controlling the circular screen, and starts the motor to drive the circular display screen to rotate slightly left and right. The rotation path can be "15° counterclockwise→0°→15° clockwise→0°" (operating in the first rotation mode), and the display screen expression mode is switched to the surprise mode expression, which communicates the emotion of being awakened from light sleep.

Optionally, after controlling the display screen to display the second display expression and controlling the display screen to rotate according to the first rotation mode, the terminal switches the operating mode of the display screen from the standby mode to the operating mode.

In an embodiment, when the operating mode is the standby mode, a display expression corresponding to the first rotation mode is displayed on the display screen, and the display screen is controlled to operate according to the first rotation mode; and the display screen is controlled to switch from the standby mode to the working mode. In this way, the user's interaction experience with the audio device is improved.

Figure 6:
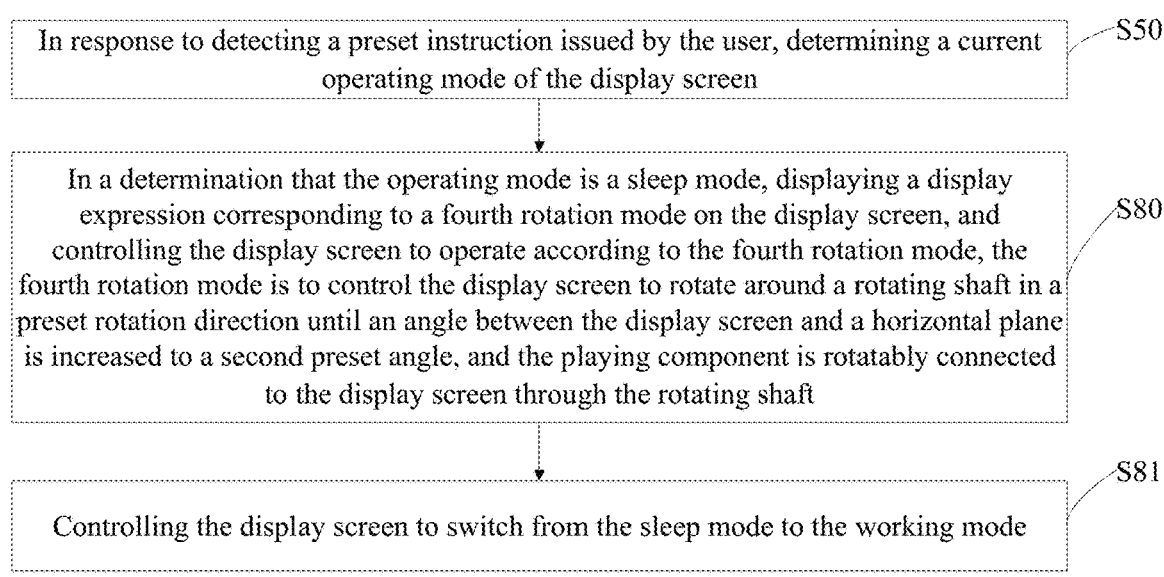
FIG. 6 is a flow chart of a fifth embodiment of the control method for the audio device according to this disclosure.

In a fifth embodiment, as shown in FIG. 6, on the basis of the embodiments of FIG. 2 to FIG. 5, after the step of in response to detecting a preset instruction issued by the user, determining a current operating mode of the display screen, the control method for the audio device further includes:

S80. In a determination that the operating mode is a sleep mode, displaying a display expression corresponding to a fourth rotation mode on the display screen, and controlling the display screen to operate according to the fourth rotation mode, the fourth rotation mode is to control the display screen to rotate around a rotating shaft in a preset rotation direction until an angle between the display screen and a horizontal plane is increased to a second preset angle, and the playing component is rotatably connected to the display screen through the rotating shaft.

S81. Controlling the display screen to switch from the sleep mode to the working mode.

In this embodiment, the operating mode of the display screen of the audio device includes a working mode, a standby mode and a sleep mode.

Optionally, when detecting a preset instruction for the audio device issued by the user, the terminal detects a current operating mode of the display screen. It should be noted that the preset instruction may be a control instruction preset by the audio device, such as controlling the audio device to play music, issuing a query instruction to the audio device, and so on.

Optionally, a display expression corresponding to the fourth rotation mode is a fourth display expression (namely, the daze mode expression).

Optionally, when detecting that the display screen is currently in the sleep mode, the terminal controls the display screen to light up, and controls the display screen to display the fourth display expression on the display screen, and at the same time, controls the display screen to operate in the fourth rotation mode.

Optionally, when controlling the display screen to operate in the fourth rotation mode, the display screen in the sleep mode is controlled to rotate eccentrically in a preset rotation direction around the rotating shaft O from the horizontal position starting from a current position of the display screen, namely, the initial position, so as to increase the angle θ between the plane where the display screen is located and the horizontal plane, so that the angle β gradually increases from 0 degree until the second preset angle is reached. After the display screen rotates, the operating mode of the display screen is switched from the sleep mode to the working mode or the standby mode.

Optionally, the value range of the second preset angle is (0°, 90°], optionally 60°; optionally, the second preset angle is equal to a maximum angle that can be reached by the included angle formed between the plane where the display screen is located and the horizontal plane.

It should be noted that the preset rotation direction is clockwise or counterclockwise.

Optionally, the display screen is controlled to display the fourth display expression in the sleep mode, and the daze mode expression is displayed, which can convey to the user the emotion that the display screen is awakened from deep sleep.

Optionally, after controlling the display screen to display the fourth display expression and controlling the display screen to rotate according to the fourth rotation mode, the terminal switches the operating mode of the display screen from the sleep mode to the operating mode.

In this way, through different modes of different actions and expressions generated by different states before the intelligent loudspeaker wakes up, the performance that the display screen has been awakened is clearly conveyed to the user, which is taken as a supplement to the light state or the screen display state. It breaks the singleness of human-computer interaction and improves the interactive experience between the user and the audio device.

In addition, this disclosure further provides an audio device, the audio device includes a playing component and a display screen rotatably connected to the playing component. The audio device includes a memory, a processor, and a control program for the audio device stored on the memory and operable on the processor, and when the control program for the audio device is executed by the processor, the steps of the control method for the audio device as described in the above embodiments are implemented.

In addition, this disclosure further provides a computer-readable storage medium, which includes a control program for an audio device, and when the control program for the audio device is executed by a processor, the steps of the control method for the audio device as described in the above embodiments are implemented.

The sequence numbers of the above embodiments of this disclosure are for description only, and do not represent the advantages and disadvantages of the embodiments.

Through the description of the above embodiments, those skilled in the art can clearly understand that the methods in the above embodiments can be implemented by means of software plus a necessary general hardware platform, and of course, can also be implemented by hardware, but in many cases the former is optional. Based on this understanding, the technical solution of this disclosure can be embodied in the form of a software product in essence or part that contributes to the prior art, and the computer software product is stored in a storage medium (such as ROM/RAM, magnetic disk, optical disk as described above), including several instructions to make a terminal apparatus (which can be a television, mobile phone, computer, server, controlled terminal, or network equipment, etc.) to implement the method described in each embodiment of this disclosure.

The above are only preferred embodiments of this disclosure and do not limit the scope of this disclosure. Any equivalent structure or equivalent process transformation made by the description and drawings of this disclosure, or directly or indirectly used in other related technical fields are similarly included in the patent protection scope of this disclosure.

What is claimed is:

1. A control method for an audio device, wherein the audio device comprises a playing component and a display screen rotatably connected to the playing component, and the control method for the audio device comprises the following steps:

detecting a position of a user;

determining a rotation mode of the display screen according to the position, wherein the rotation mode comprises a first rotation mode, the first rotation mode is to control the display screen to rotate back and forth at a first preset angle, a value of the first preset angle ranges from 10° to 30°;

acquiring a display expression corresponding to the rotation mode, wherein the display expression comprises a confused mode expression, a surprise mode expression, a thinking mode expression, and a daze mode expression;

displaying the display expression on the display screen, and controlling the display screen to operate according to the rotation mode;

in response to detecting a preset instruction issued by the user, determining a current operating mode of the display screen, wherein the operating mode comprises a working mode, a standby mode and a sleep mode, the daze mode expression is displayed in response to that the display screen is in the sleep mode, and the preset instruction comprises controlling an audio device to play music, and issuing a query instruction to the audio device;

in a determination that the operating mode is the working mode, performing the step of detecting the position of the user; and in response to detecting that the display screen in the working mode does not receive the preset instruction issued by the user within a preset duration, controlling the operating mode of the display screen to switch to the standby mode, wherein a value of the preset duration ranges from 30 seconds to 2 minutes, and in response to that the current operating mode of the display screen is the standby mode, the display screen is woken up by a voice instruction with a wake-up word issued by the user.

2. The control method for the audio device of claim 1, wherein the step of determining a rotation mode of the display screen according to the position comprises:
   determining a target area according to the position; and
   determining the rotation mode of the display screen according to the target area.

3. The control method for the audio device of claim 2, wherein:
   in a determination that the target area is a first area, determining that the rotation mode is the first rotation mode;
   in a determination that the target area is a second area, determining that the rotation mode is a second rotation mode, wherein the second rotation mode is to control the display screen to rotate counterclockwise; or
   in a determination that the target area is a third area, determining that the rotation mode is a third rotation mode, wherein the third rotation mode is to control the display screen to rotate clockwise.

4. The control method for the audio device of claim 2, wherein sound apparatuses are arranged on the playing component, and after the step of determining a target area according to the position, the control method for the audio device further comprises:
   acquiring a sound apparatus corresponding to the target area as a target sound apparatus; and
   controlling the audio device to output sound effects through the target sound apparatus.

5. The control method for the audio device of claim 4, wherein before the step of controlling the audio device to output sound effects through the target sound apparatus, the control method for the audio device further comprises:
   detecting whether the user is in motion; wherein:
   in a determination that the user is not in motion, performing the step of acquiring a sound apparatus corresponding to the target area as a target sound apparatus; or
   in a determination that the user is in motion, acquiring all the sound apparatuses of the audio device as the target sound apparatus.

6. The control method for the audio device of claim 1, wherein after the step of in response to detecting a preset instruction issued by the user, determining a current operating mode of the display screen, the control method for the audio device further comprises:
   in a determination that the operating mode is the standby mode, displaying a display expression corresponding to the first rotation mode on the display screen, and controlling the display screen to operate according to the first rotation mode; and
   controlling the display screen to switch from the standby mode to the working mode.

7. The control method for the audio device of claim 1, wherein after the step of in response to detecting a preset instruction issued by the user, determining a current operating mode of the display screen, the control method for the audio device further comprises:
   in a determination that the operating mode is the sleep mode, displaying a display expression corresponding to a fourth rotation mode on the display screen, and controlling the display screen to operate according to the fourth rotation mode, wherein the fourth rotation mode is to control the display screen to rotate around a rotating shaft in a preset rotation direction until an angle between the display screen and a horizontal plane is increased to a second preset angle, and the playing component is rotatably connected to the display screen through the rotating shaft; and
   controlling the display screen to switch from the sleep mode to the working mode.

8. An audio device, comprising a playing component and a display screen rotatably connected to the playing component, wherein the audio device comprises a memory, a processor, and a control program for the audio device stored on the memory and operable on the processor, and when the control program for the audio device is executed by the processor, the steps of the control method for the audio device as recited in claim 1 are implemented.

9. A non-transitory computer-readable storage medium, wherein a control program for an audio device is stored thereon, and when the control program for the audio device is executed by a processor, the steps of the control method for the audio device as recited in claim 1 are implemented.

* * * * *